(12) United States Patent
Matsumoto et al.

(10) Patent No.: US 10,250,836 B2
(45) Date of Patent: Apr. 2, 2019

(54) SOLID-STATE IMAGE SENSING APPARATUS, CONTROL METHOD, AND ELECTRONIC DEVICE

(71) Applicant: SONY CORPORATION, Minato-Ku (JP)

(72) Inventors: Shizunori Matsumoto, Kanagawa (JP); Pawankumar Pradeepkumar Moyade, San Jose (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/531,817

(22) PCT Filed: Dec. 2, 2015

(86) PCT No.: PCT/JP2015/083842
§ 371 (c)(1),
(2) Date: May 31, 2017

(87) PCT Pub. No.: WO2016/098590
PCT Pub. Date: Jun. 23, 2016

(65) Prior Publication Data
US 2017/0332026 A1 Nov. 16, 2017

(30) Foreign Application Priority Data
Dec. 15, 2014 (JP) .................................. 2014-252724

(51) Int. Cl.
*H04N 5/378* (2011.01)
*H04N 5/3745* (2011.01)
(Continued)

(52) U.S. Cl.
CPC ........... *H04N 5/378* (2013.01); *H04N 5/3456* (2013.01); *H04N 5/3575* (2013.01); *H04N 5/3745* (2013.01); *H04N 5/37455* (2013.01)

(58) Field of Classification Search
CPC .......................... H04N 5/378; H04N 5/37455
See application file for complete search history.

(56) References Cited

U.S. PATENT DOCUMENTS

| 2008/0036890 A1 | 2/2008 | Yamashita et al. |
| 2009/0218476 A1 | 9/2009 | Kameshima et al. |

(Continued)

FOREIGN PATENT DOCUMENTS

| JP | 2007-050053 A | 3/2007 |
| JP | 2007-214791 A | 8/2007 |

(Continued)

OTHER PUBLICATIONS

International Search Report and Written Opinion of PCT Application No. PCT/JP2015/083842, dated Jan. 12, 2016, 2 pages of English Translation and 7 pages of ISRWO.

*Primary Examiner* — Mekonnen D Dagnew
(74) *Attorney, Agent, or Firm* — Wolf, Greenfield & Sacks, P.C.

(57) ABSTRACT

The present disclosure relates to a solid-state image sensing apparatus, a control method, and an electronic device capable of reducing a settling time of a vertical signal line at the time of a read operation of pixels. A column processing unit A/D converts pixel signals of a plurality of pixels. A vertical signal line feeds the pixel signals output from the pixels to the A/D converter. A pull-up circuit increases a potential of the vertical signal line at the time of starting a read operation of the pixels. For example, the present disclosure can be applied to a CMOS (Complementary Metal-Oxide Semiconductor) image sensor that performs an interleaving operation or the like.

9 Claims, 11 Drawing Sheets

(51) Int. Cl.
  *H04N 5/345* (2011.01)
  *H04N 5/357* (2011.01)

(56) References Cited

U.S. PATENT DOCUMENTS

| | | | |
|---|---|---|---|
| 2012/0062776 A1* | 3/2012 | Egawa | H04N 5/378 |
| | | | 348/302 |
| 2015/0076327 A1 | 3/2015 | Amikawa et al. | |
| 2015/0189203 A1* | 7/2015 | Araoka | H03M 1/34 |
| | | | 348/302 |
| 2015/0249797 A1 | 9/2015 | Yui et al. | |

FOREIGN PATENT DOCUMENTS

| | | |
|---|---|---|
| JP | 2008-136042 A | 6/2008 |
| JP | 2008-136239 A | 6/2008 |
| JP | 2011-114731 A | 6/2011 |
| JP | 2011-259407 A | 12/2011 |
| WO | 2011/064921 A1 | 6/2011 |
| WO | 2013/179597 A1 | 12/2013 |
| WO | 2014/065223 A1 | 5/2014 |

\* cited by examiner

SOLID-STATE IMAGE SENSING APPARATUS, CONTROL METHOD, AND ELECTRONIC DEVICE

CROSS REFERENCE TO RELATED APPLICATIONS

This application is a U.S. National Phase of International Patent Application No. PCT/JP2015/083842 filed on Dec. 2, 2015, which claims priority benefit of Japanese Patent Application No. JP 2014-252724 filed in the Japan Patent Office on Dec. 15, 2014. Each of the above-referenced applications is hereby incorporated herein by reference in its entirety.

TECHNICAL FIELD

The present disclosure relates to a solid-state image sensing apparatus, a control method, and an electronic device, and more particularly to a solid-state image sensing apparatus, a control method, and an electronic device capable of reducing a settling time of a vertical signal line at the time of a read operation of pixels.

BACKGROUND ART

In a CMOS (Complementary Metal-Oxide Semiconductor) image sensor, a column ADC that performs a CDS (Correlated Double Sampling) is widely used (see Patent Literature 1). In a case where an A/D (Analog/Digital) conversion is performed on a pixel signal by the column ADC that performs the CDS, it is necessary to read a reset level signal (P phase) before a pixel signal (D phase) is read at the time of the read operation of the pixels.

CITATION LIST

Patent Literature

Patent Literature 1: Japanese Patent Application Laid-open No. 2011-259407

DISCLOSURE OF INVENTION

Technical Problem

However, a settling time to settle a level of a vertical signal line down to a level of a reset level signal becomes long at the time of starting a read operation of pixels, in a case where the level of the pixel signal to be A/D converted immediately before is low. Thus, it is difficult to perform the read operation at a high speed.

The present disclosure is made in view of the above-mentioned circumstances, and it is an object of the present disclosure to reduce a settling time of a vertical signal line at the time of starting a read operation of pixels.

Solution to Problem

A solid-state image sensing apparatus according to an aspect of the present disclosure includes an A/D converter that A/D converts pixel signals of a plurality of pixels, a vertical signal line that feeds the pixel signals output from the pixels to the A/D converter, and a circuit that increases a potential of the vertical signal line at the time of starting a read operation of the pixels.

A control method and an electronic device according to aspects of the present disclosure correspond to the solid-state image sensing apparatus according to an aspect of the present disclosure.

In the aspect of the present disclosure, an A/D converter that A/D converts pixel signals of a plurality of pixels and a vertical signal line that feeds the pixel signals output from the pixels to the A/D converter are included, a potential of the vertical signal line is increased at the time of starting a read operation of the pixels.

Advantageous Effects of Invention

According to an aspect of the present disclosure, image sensing can be performed. In addition, according to a first aspect of the present disclosure, a settling time of a vertical signal line can be reduced at the time of a read operation of pixels.

It should be noted that the effects described here are not necessarily limitative and may be any of effects described in the present disclosure.

MODE(S) FOR CARRYING OUT THE INVENTION

Hereinafter, modes for carrying out the present disclosure (hereinafter referred to as embodiments) will be described. Note that the description will be made in the following order.
1. First embodiment: CMOS image sensor (FIG. 1 to FIG. 5)
2. Second embodiment: CMOS image sensor (FIG. 6 and FIG. 7)
3. Third embodiment: CMOS image sensor (FIG. 8 to FIG. 10)
4. Fourth embodiment: image sensing apparatus (FIG. 11)

First Embodiment (Configuration Example of CMOS Image Sensor According to First Embodiment)

Figure 1:
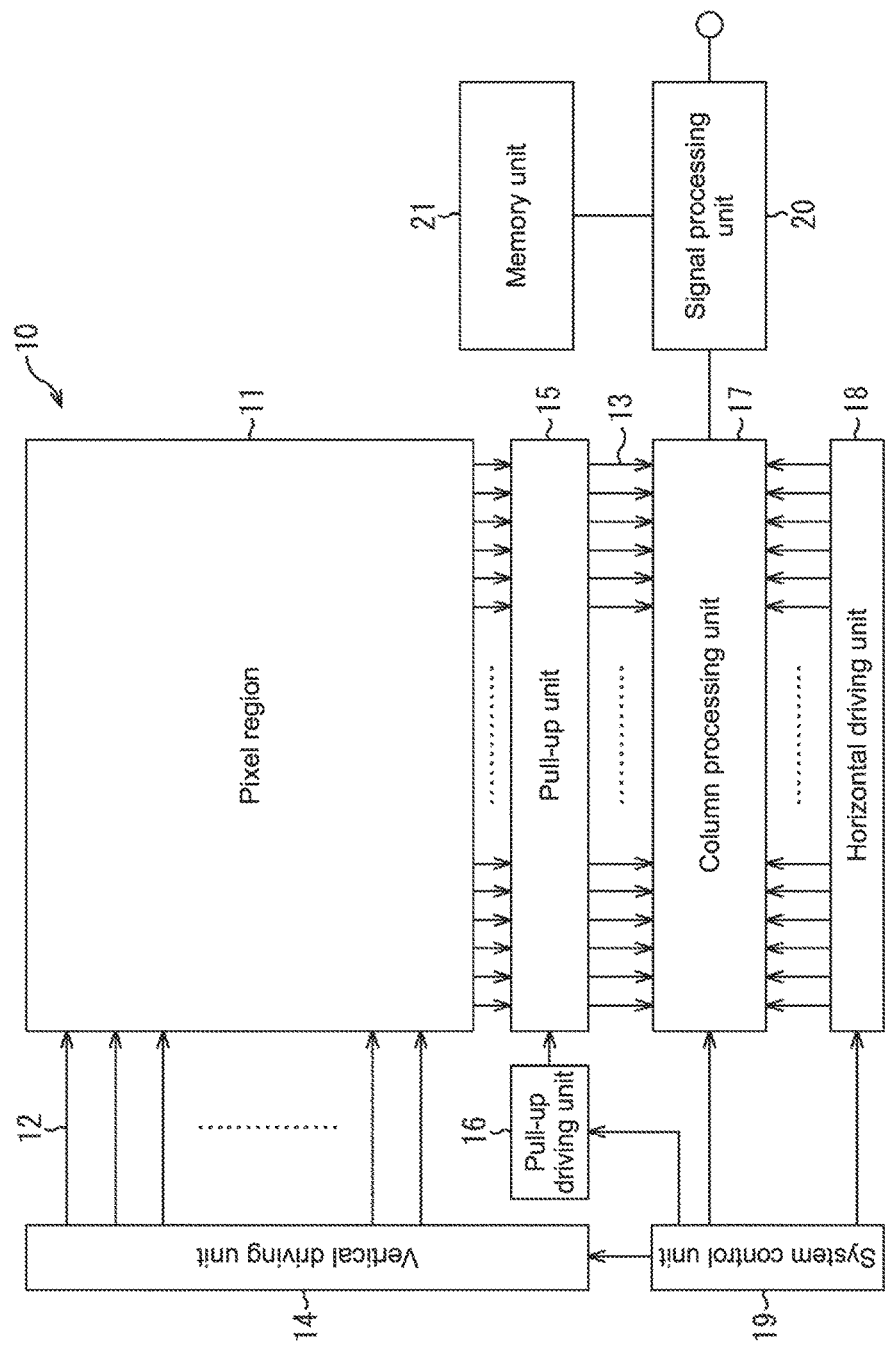
FIG. 1 is a diagram showing a configuration example of a CMOS image sensor according to a first embodiment as a solid-state image sensing apparatus to which the present disclosure is applied.

FIG. 1 is a diagram showing a configuration example of a CMOS image sensor according to a first embodiment as a solid-state image sensing apparatus to which the present disclosure is applied.

A CMOS image sensor 10 includes a pixel region 11, pixel driving lines 12, vertical signal lines 13, a vertical driving unit 14, a pull-up unit 15, a pull-up driving unit 16, a column processing unit 17, a horizontal driving unit 18, a system control unit 19, a signal processing unit 20, and a memory unit 21 formed on a semiconductor substrate (chip) such as a silicon substrate (not shown).

Pixels are two-dimensionally arranged in a matrix in the pixel region 11 of the CMOS image sensor 10, and imaging is performed. The pixel includes a photoelectric conversion element that generates charges having a charge amount corresponding to an amount of incident light, and accumulates the charges inside. In addition, the pixel driving lines 12 are formed for one row of the pixels in the matrix, and the vertical signal lines 13 are formed for one column of the pixels in the matrix in the pixel region 11.

The vertical driving unit 14 includes a shift resistor, an address decoder, and the like, and drives pixels of each row unit in the pixel region 11. One end of each pixel driving line 12 is connected to an output end (not shown), which corresponds to each row, of the vertical driving unit 14. Although a specific configuration of the vertical driving unit 14 is not shown, the vertical driving unit 14 includes two scanning systems of a read scanning system and a sweep scanning system, and performs an interleaving operation, in which the read scanning system reads the pixels in one row and the sweep scanning system resets the pixels in another row at the same time.

Specifically, the read scanning system selects each row in the order in order to read a pixel signal from pixels in each row unit, and outputs a selection signal, a transfer signal, and the like from the output end connected to the pixel driving line 12 of a selected row. Thus, the read operation is performed on the pixels in the row selected by the read scanning system, in which a reset level is read and an electric signal of the charges accumulated in the photoelectric conversion element is read as the pixel signal. The read reset level signal and the read pixel signal are fed to the column processing unit 17 via the vertical signal lines 13.

The sweep scanning system outputs a reset signal from the output end connected to the pixel driving line 12 of the row-to-be-selected-next during the read operation of the pixels in the selected row in order to sweep (reset) unnecessary charges accumulated in the photoelectric conversion element of the pixels in the row-to-be-selected-next. Through the scanning by the sweep scanning system, the reset operation is performed on the pixels in the row-to-be-selected-next during the read operation of the pixels in the selected row.

The pull-up unit 15 includes pull-up circuits for the vertical signal lines 13, respectively. The pull-up circuit is driven by the pull-up driving unit 16, and increases (pulls up) the potential of each vertical signal line 13 in a case where the potential of the vertical signal line 13 is equal to or less than a predetermined value.

The pull-up driving unit 16 drives the pull-up unit 15 in a predetermined period at the time of starting the read operation of the pixels in the selected row.

The column processing unit 17 (A/D converter) includes A/D conversion circuits for the columns of the pixel region 11, respectively, and a D/A (Digital/Analog) conversion circuit common to all the columns. Each A/D conversion circuit includes a PGA (Programmable Gain Amplifier), a comparator, and a counter latch, and performs A/D conversion processing, CDS (correlation double sampling) processing, and the like with respect to the pixel signal fed from the pixels in the selected row through the vertical signal lines 13.

Specifically, firstly, the PGA of the A/D conversion circuit amplifies the reset level signal fed through the vertical signal line 13 at the time of the read operation of the pixels in the selected row and corresponding to the column. The comparator compares a ramp wave signal generated by the D/A conversion circuit with the amplified reset level signal. The counter latch counts a time for comparison of the comparator until a comparison result is changed, and holds the count result as digital data after the A/D conversion of the reset level signal.

Next, the PGA amplifies the pixel signal fed through the vertical signal line 13 after the reset level signal at the time of the read operation of the pixels in the selected row and corresponding to the column. The comparator compares the ramp wave signal generated by the D/A conversion circuit with the amplified pixel level signal. The counter latch subtracts the time for comparison of the comparator until the comparison result is changed from the held digital data of the reset level signal. Thus, the counter latch holds a subtracted result as a CDS processing result.

The horizontal driving unit 18 includes a shift resistor, an address decoder, and the like, and selects the A/D conversion circuit of the column processing unit 17 in the order. Through the select scanning by the horizontal driving unit 18, the digital data that is the CDS processing result of the pixel signal held by each A/D conversion circuit of the column processing unit 17 is output to the signal processing unit 20 as the pixel data in the order.

The system control unit 19 includes a timing generator that generates a variety of timing signals, and the like, and controls the vertical driving unit 14, the pull-up driving unit 16, the column processing unit 17, and the horizontal driving unit 18 on the basis of the variety of timing signals generated by the timing generator.

The signal processing unit 20 has at least an adding function. The signal processing unit 20 performs a variety of signal processing such as adding and the like on the pixel data output from the column processing unit 17. At this time, the signal processing unit 20 stores an interim result of the signal processing on the memory unit 21 as necessary, and refers the interim result at a necessary timing. The signal processing unit 20 outputs the pixel data on which the signal processing is performed.

The memory unit 21 includes a DRAM (Dynamic Random Access Memory), an SRAM (Static Random Access Memory), and the like.

(Configuration Example of Pixel Region and Pull-Up Unit)

Figure 2:
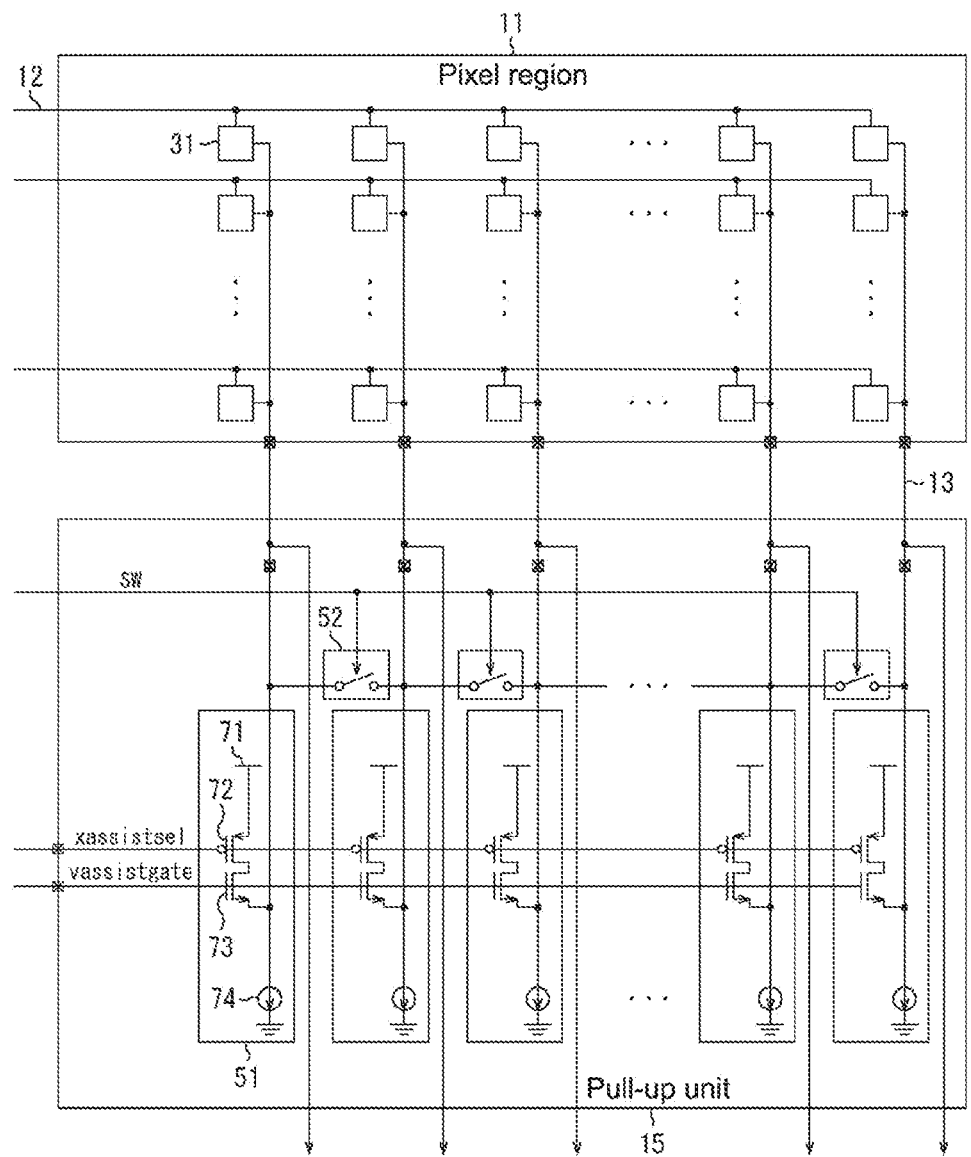
FIG. 2 is a diagram showing a configuration example of a pixel region 11 and a pull-up unit 15.

FIG. 2 shows a configuration example of the pixel region 11 and the pull-up unit 15.

As shown in FIG. 2, the pixels 31 are two-dimensionally arranged in a matrix of n rows and m columns (n and m each is an integer of 1 or more) in the pixel region 11. Each pixel driving line 12 is formed for each row of the pixels 31, and each vertical signal line 13 is formed for each column of the pixels 31. Thus, the number of the pixel driving lines 12 is n, and the number of the vertical signal lines 13 is m.

The pull-up unit 15 includes m pull-up circuits 51 provided for the vertical signal lines 13, respectively, and m−1 switches 52 provided between two adjacent vertical signal lines 13.

Each pull-up circuit 51 is a current source circuit for driving each vertical signal line 13, and is formed of a power supply 71, two transistors 72 and 73, and a current source 74.

The transistor 72 and the transistor 73 are connected in series. Specifically, the transistor 72 and the transistor 73 are connected in series between the power supply 71 and the vertical signal line 13 such that the transistor 72 is connected to the power supply 71 and the transistor 73 is connected to the vertical signal line 13.

A control signal xassistsel that controls on/off of the transistor 72 is input to the transistor 72 from the pull-up driving unit 16 of FIG. 1. The transistor 72 is turned on/off in response to the control signal xassistsel to control on/off of the pull-up circuit 51.

A signal vassistgate having a predetermined potential is input to the transistor 73 from the pull-up driving unit 16. Using the signal vassistgate, the transistor 73 controls a potential range of the vertical signal line 13 that the pull-up circuit 51 is operated. One end of the current source 74 is connected to the connection point between the vertical signal line 13 and the transistor 73, and the other end is grounded.

With the above-described configuration, in a case where the transistor 72 is turned on and the potential of the vertical signal line 13 is equal to or less than the potential of the signal vassistgate, the transistor 73 can increase the potential of the vertical signal line 13.

The switch 52 (connector) is arranged between the two adjacent vertical signal lines 13, and controls the connection between the two adjacent vertical signal lines 13 on the basis of a control signal SW that controls on/off of the switch 52 input from the pull-up driving unit 16.

(Circuit Configuration Example of Pixel)

Figure 3:
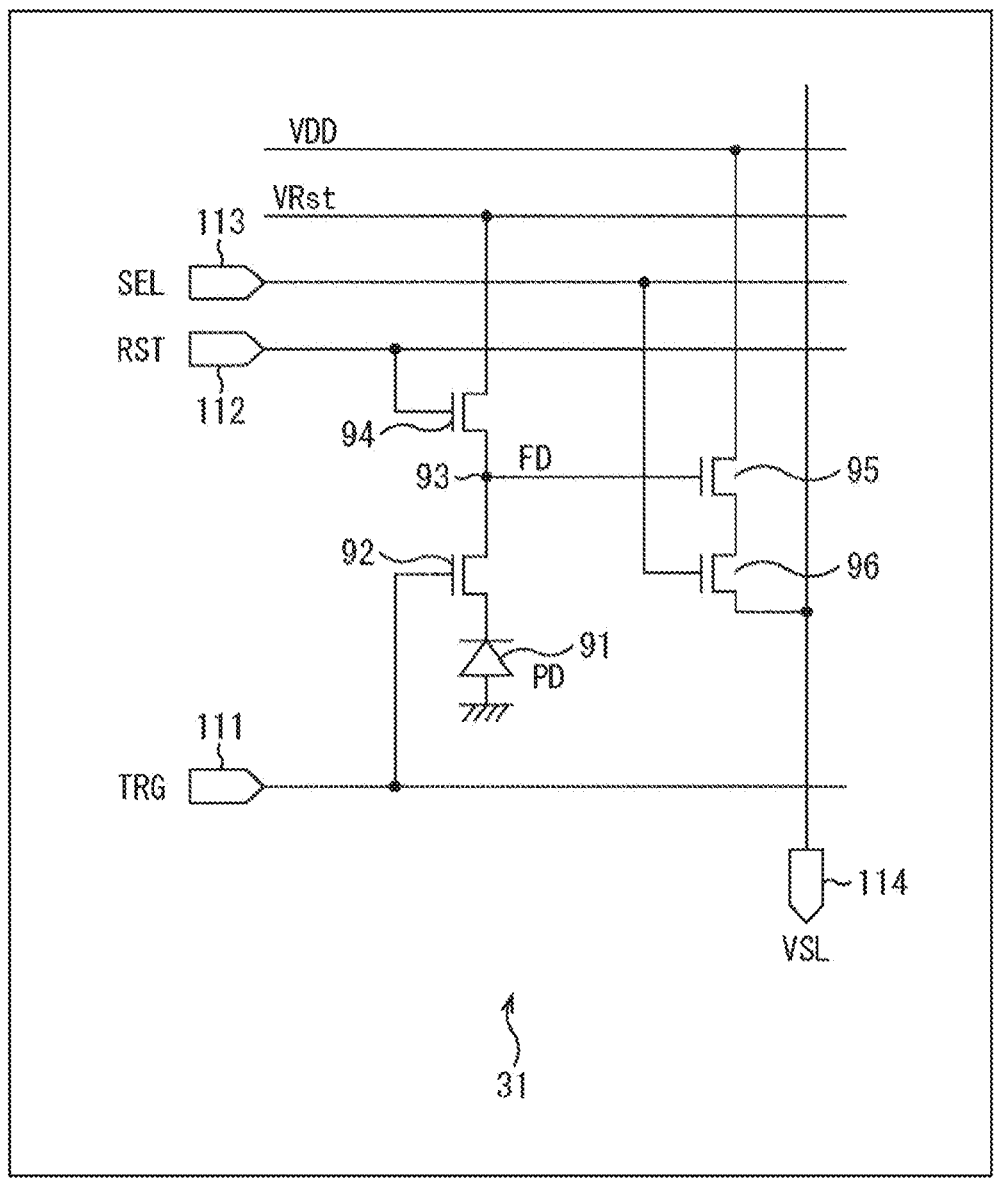
FIG. 3 is a diagram showing a circuit configuration example of a pixel 31 of FIG. 2.

FIG. 3 is a diagram showing a circuit configuration example of the pixel 31 of FIG. 2.

The pixel 31 includes a photodiode 91 as the photoelectric conversion element, a transfer transistor 92, an FD (floating diffusion) 93, a reset transistor 94, an amplifier transistor 95, and a selection transistor 96. Further, the pixel 31 is connected to the terminal 111 to the terminal 114.

The photodiode 91 generates charges corresponding to an amount of incident light, and accumulates the charges. An anode terminal of the photodiode 91 is grounded, and a cathode terminal thereof is connected to the FD 93 via the transfer transistor 92.

A gate terminal of the transfer transistor 92 is connected to the terminal 111 to which the pixel driving line 12 that feeds the transfer signal is connected, of the pixel driving lines 12 in the corresponding row. When the transfer transistor 92 is turned on by the transfer signal, the transfer transistor 92 reads the charges generated at the photodiode 91, and transfers the charges to the FD 93.

The FD 93 holds the charges read from the photodiode 91. The gate terminal of the reset transistor 94 is connected to a terminal 112 to which the pixel driving line 12 that feeds the reset signal is connected, of the pixel driving lines 12 in the corresponding row. When the reset transistor 94 is turned on by the reset signal, the reset transistor 94 discharges the charges accumulated on the FD 93 to a constant voltage supply VRst, thereby resetting the potential of the FD 93.

A gate terminal of the amplifier transistor 95 is connected to the FD 93. The amplifier transistor 95 outputs the reset level signal and the pixel signal corresponding to the potential of the FD 93 using the power supply VDD.

A gate terminal of the selection transistor 96 is connected to a terminal 113 to which the pixel driving line 12 that feeds the selection signal is connected, of the pixel driving lines 12 in the corresponding row. When the selection transistor 96 is turned on by the selection signal, the selection transistor 96 feeds the reset level signal and the pixel signal output from the amplifier transistor 95 to the terminal 114. The terminal 114 is connected to the vertical signal line 13, and the reset level signal and the pixel signal fed to the terminal 114 are fed to the column processing unit 17 via the vertical signal lines 13.

(Example of Timing Chart of CMOS Image Sensor)

Figure 4:
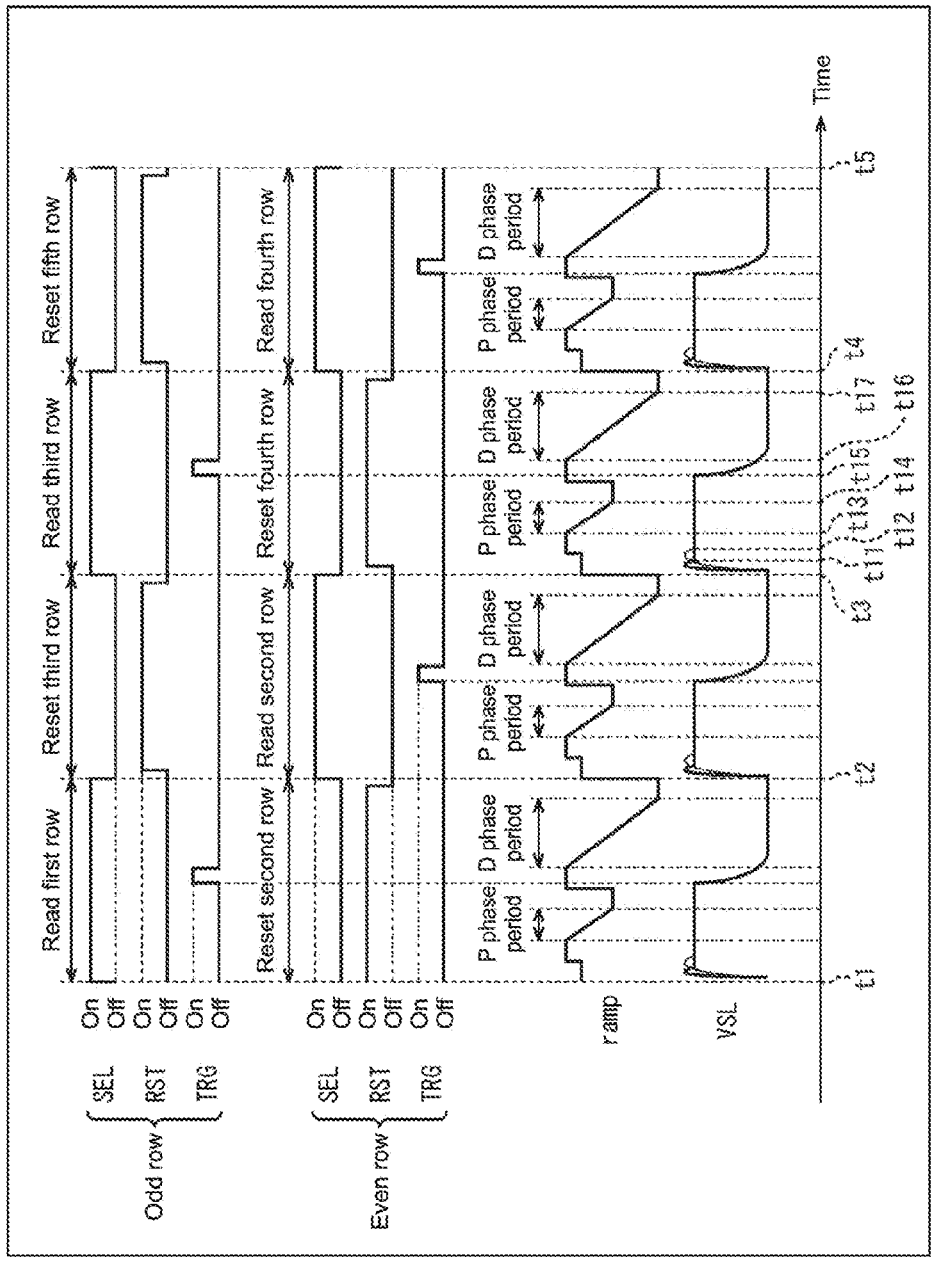
FIG. 4 is a diagram showing an example of a timing chart of the CMOS image sensor of FIG. 1.

FIG. 4 is a diagram showing an example of a timing chart of the potentials of the selection signals, the reset signals, the transfer signals, the ramp wave signal, and the vertical signal line 13 of the CMOS image sensor 10 of FIG. 1. In addition, FIG. 5 is a diagram showing an example of a timing chart of the potentials of the selection signals, the reset signals, the transfer signals, the FD 93, the control signal SW, the control signal xassistsel, and the vertical signal line 13 around the time t3 of FIG. 4.

Figure 5:
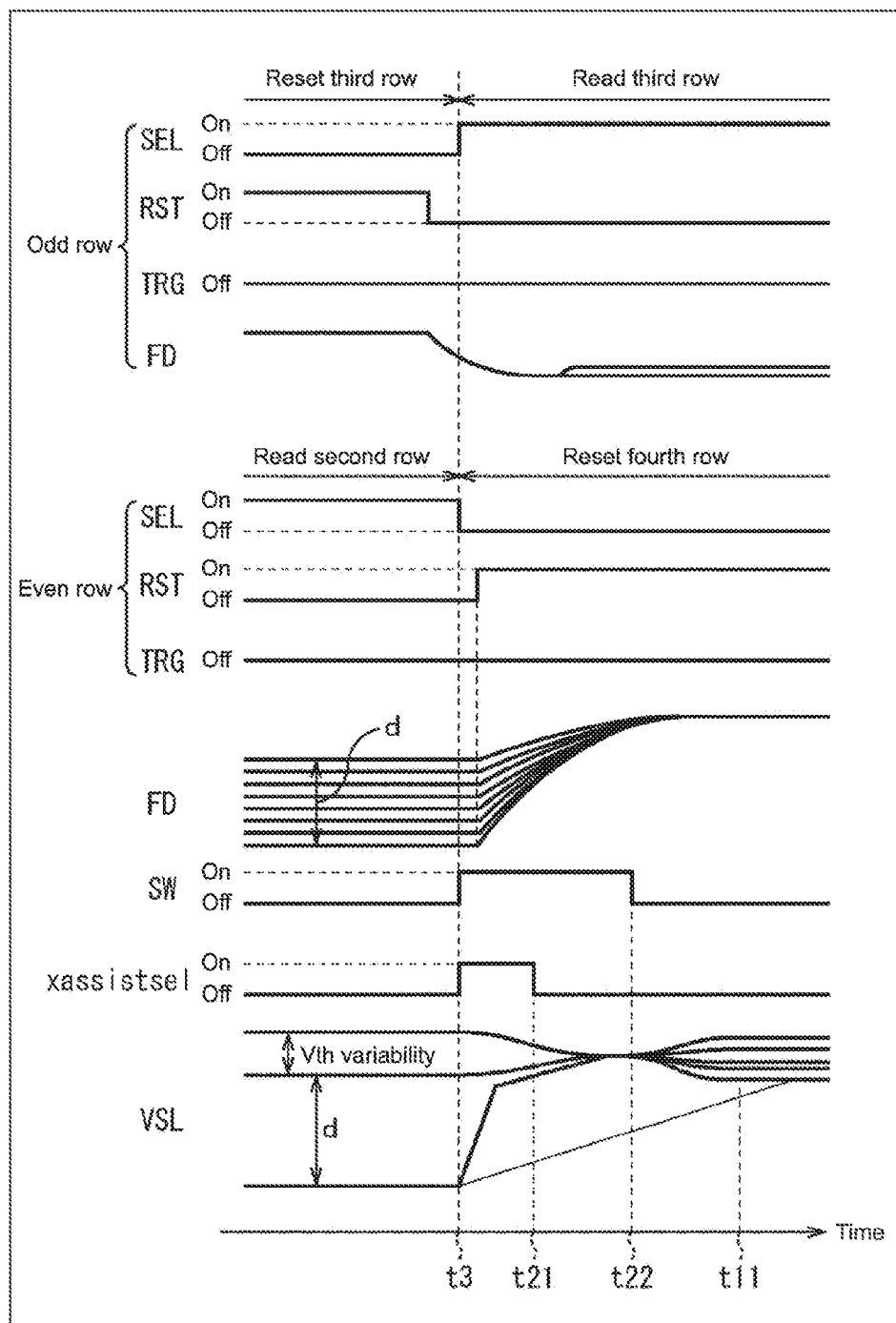
FIG. 5 is a diagram showing an example of a timing chart around a time t3 of FIG. 4.

Note that the horizontal axis represents time, and the vertical axis represents potential (level) of each signal of each of FIG. 4 and FIG. 5. The same applies to FIG. 10 described later.

In the CMOS image sensor 10, the vertical driving unit 14 selects the row in the order from the top, and turns on the selection signal (SEL) of the selected row, whereby the read operation is performed on the pixels 31 in the selected row. While the read operation is performed on the pixels 31 in the selected row, the vertical driving unit 14 turns on the reset signal (RST) of the pixels 31 in the row-to-be-selected-next, whereby the reset operation is performed on the pixels 31 in the row-to-be-selected-next.

Thus, the selection signal for the first row is turned on between the time t1 and the time t2, and the selection signal for the second row is turned on between the time t2 and the time t3, as shown in FIG. 4. Then, the selection signal for the third row is turned on between the time t3 and the time t4, and the selection signal for the fourth row is turned on between the time t4 and the time t5.

Also, the reset signal for the second row is turned on between the time shortly after the time t1 and the time shortly before the time t2, and the reset signal for the third row is turned on between the time shortly after the time t2 and the time shortly before the time t3. Then, the reset signal for the fourth row is turned on between the time shortly after the time t3 and the time shortly before the time t4, and the reset signal for the fifth row is turned on between the time shortly after the time t4 and the time shortly before the time t5.

When the selection signal for the pixels 31 in the third row is turned on at the time t3, the transfer signal (TRG) for the pixels 31 in the third row is not yet turned on. Thus, the reset level signal corresponding to the potential of the FD 93 reset by the reset operation is read by the vertical signal line 13.

However, as the read operation is performed on the pixels 31 in the second row until the time t3, the potential VSL of the vertical signal line 13 at the time t3 is the potential of the pixel signal for the pixels 31 in the second row.

Note that FIG. 4 shows the case that the value of the potential of the pixel signal for the pixels 31 in the second row is the lowest. In fact, the value of the potential of the pixel signal (potential of the FD 93) is within a range d as shown in FIG. 5. The maximum value within the range d is determined by a threshold voltage Vth of the amplifier transistor 95.

In a case where the potential of the pixel signal for the pixels 31 in the second row is low, i.e., the amount of light received by the pixels 31 is great, the CMOS image sensor having no pull-up unit 15 takes much time to settle the potential VSL down to the potential of the reset level signal for the pixels 31 in the third row, as shown by the thin lines of FIG. 4 and FIG. 5. In other words, a settling time between the time t3 at which the read operation is started and the time t12 at which the potential VSL is settled down to the potential of the reset level signal becomes long.

The A/D conversion cannot be performed on the reset level signal until the potential VSL reaches the potential of the reset level signal. Therefore, in a case where the settling time of the potential VSL is long, a read operation period between the time t3 and the time t4 becomes long.

In contrast, in the CMOS image sensor 10 having the pull-up unit 15, the control signal xassistsel is turned on over the period between the time t3 at which the read operation of the pixels 31 in the third row is started and the time t21 (t3<t21<t11), as shown in FIG. 5. In this manner, in a case where the potential VSL is the potential of the signal vassistgate or less over the period between the time t3 and the time t21, an increase of the potential VSL is assisted by the pull-up unit 15.

In addition, the control signal SW is turned on over the period between the time t3 and the time t22 (t21<t22<t11). In this manner, all the m−1 switches 52 are turned on over the period between the time t3 and the time t22, and all the vertical signal lines 13 are connected. As a result, the potentials VSL of all the vertical signal lines 13 are averaged.

In view of the above, the potential VSL increases rapidly from the potential of the pixel signal for the pixels 31 in the second row after the time t3, and settles down to the potential of the reset level signal for the pixels 31 in the third row at the time t11 before the time t12, as shown by the thick lines of FIG. 4 and FIG. 5. In other words, the settling period is the period between the time t3 and the time t11 that is shorter than the period between the time t3 and the time t12. As a result, the read operation period between the time t3 and the time t4 can be reduced, and a frame rate can be increased.

After the time t11, when a ramp wave signal ramp reaches the maximum value (initial value) at the time t13, the A/D conversion of the reset level signal is started. When the ramp wave signal ramp reaches the predetermined value at the time t14, the potential of the signal ramp is maintained, and the A/D conversion of the reset level signal is ended. Thereafter, the vertical driving unit 14 turns on the transfer signal for the pixels 31 in the third row at the time t15. In this manner, the charges are transferred from the photodiodes 91 to the FDs 93 of the pixels 31 in the third row, and the pixel signal corresponding to the charges is read by the vertical signal line 13. As a result, the potential VSL of the vertical signal line 13 is decreased to the potential of the pixel signal.

Thereafter, when the ramp wave signal ramp reaches the maximum value (initial value) at the time t16, the A/D conversion of the pixel signal is started. When the ramp wave signal ramp reaches the predetermined value at the time t17, the potential of the signal ramp is maintained, and the A/D conversion of the pixel signal is ended.

Here, although only the read operation of the pixels 31 in the third row is described, the same applies to the read operation of the pixels 31 in other rows.

It should be noted that the pull-up circuit 51 may be driven only where a gain of the PGA in the A/D conversion circuit has the predetermined value or less, i.e., where a possible range of the potential VSL is great at the time of starting the read operation, and the potential of the vertical signal line 13 may be increased.

As described above, since the CMOS image sensor 10 includes the pull-up circuit 51 that increases the potential VSL of the vertical signal line 13 at the time of starting the read operation of the pixels 31, the read operation period, i.e., an A/D conversion time can be reduced. In addition, since the pull-up circuit 51 increases the potential VSL of the vertical signal line 13 by the transistor 73, a consumption current is not increased thereby.

Furthermore, since the CMOS image sensor 10 performs the read operation of the pixels 31 in the selected row and the reset operation of the pixels 31 in the row-to-be-selected-next at the same time, the time necessary for generating the pixel data can be reduced.

Second Embodiment (Configuration Example of CMOS Image Sensor According to Second Embodiment)

Figure 6:
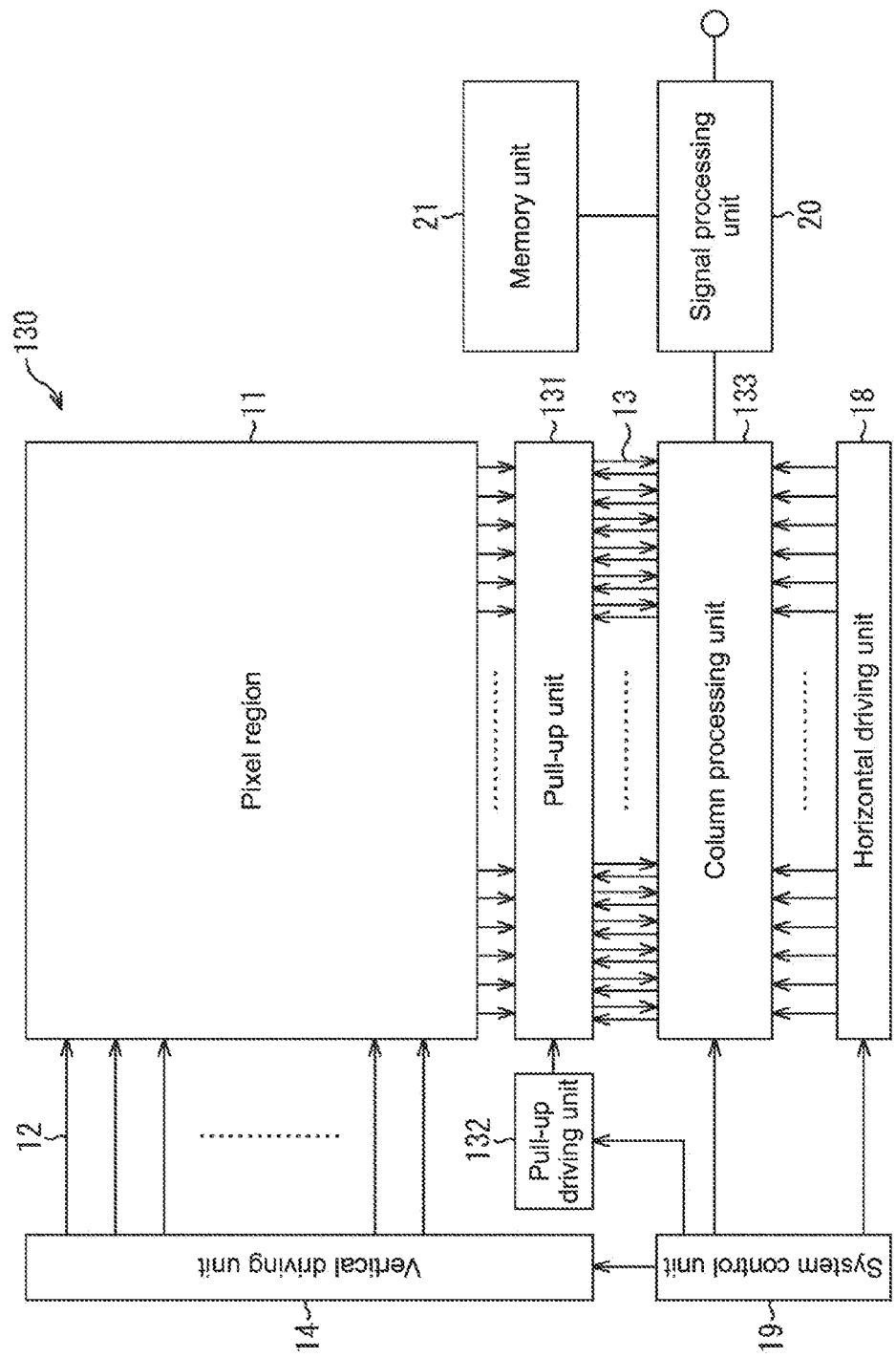
FIG. 6 is a diagram showing a configuration example of a CMOS image sensor according to a second embodiment as a solid-state image sensing apparatus to which the present disclosure is applied.

FIG. 6 is a diagram showing a configuration example of a CMOS image sensor according to a second embodiment as a solid-state image sensing apparatus to which the present disclosure is applied.

The configurations of FIG. 6 similar to the configurations of FIG. 1 are denoted by the same reference signs. Overlapping descriptions will be omitted as appropriate.

The configurations of a CMOS image sensor 130 of FIG. 6 are different from the configurations of the CMOS image sensor 10 of FIG. 1 in that a pull-up unit 131, a pull-up driving unit 132, and a column processing unit 133 are provided in place of the pull-up unit 15, the pull-up driving unit 16, and the column processing unit 17. The CMOS image sensor 130 drives the pull-up circuit 51 of the pull-up unit 131 only where the pixel data of the pixels 31 in the row-in-front-of-the-selected-row has a predetermined value or more at the time of starting the read operation.

Specifically, the pull-up unit 131 of the CMOS image sensor 130 includes the pull-up circuits 51 for the vertical signal lines 13, respectively, and switches 52 each provided between two adjacent vertical signal lines 13. In a case where the control signal xassistsel fed from the pull-up driving unit 132 is on, and the pixel data fed from the A/D conversion circuit of the column processing unit 133 of the corresponding column has the predetermined value or more, the pull-up circuit 51 is driven.

In a case where the potential of the vertical signal line 13 is equal to or less than the potential of the signal vassistgate fed from the pull-up driving unit 132, the pull-up circuit 51 increases the potential of the vertical signal line 13. In addition, in a case where the control signal SW fed from the pull-up driving unit 132 is turned on, each switch 52 connects the corresponding two vertical signal lines 13, thereby connecting all the vertical signal lines 13.

The pull-up driving unit 132 turns on the control signal xassistsel that is fed to the pull-up unit 131 for the predetermined period at the time of starting the read operation of the pixels 31 in the selected row. Also, the pull-up driving unit 132 turns on the control signal SW fed to the pull-up unit 131 for the predetermined period at the time of starting the read operation of the pixels 31 in the selected row, and all the vertical signal lines 13 are thereby connected. Furthermore, the pull-up driving unit 132 controls the potential VSL of the vertical signal line 13, which is operated by the pull-up circuit 51, by feeding the signal vassistgate to the pull-up unit 131.

The column processing unit 133 includes the A/D conversion circuits for the columns of the pixel region 11, respectively, and the D/A conversion circuit common to all the columns, and performs the A/D conversion processing, the CDS processing, and the like similar to the column processing unit (A/D converter) of FIG. 1. Each A/D conversion circuit feeds the resultant pixel data to the pull-up unit 131.

(Configuration Example of Pixel Region and Pull-Up Unit)

Figure 7:
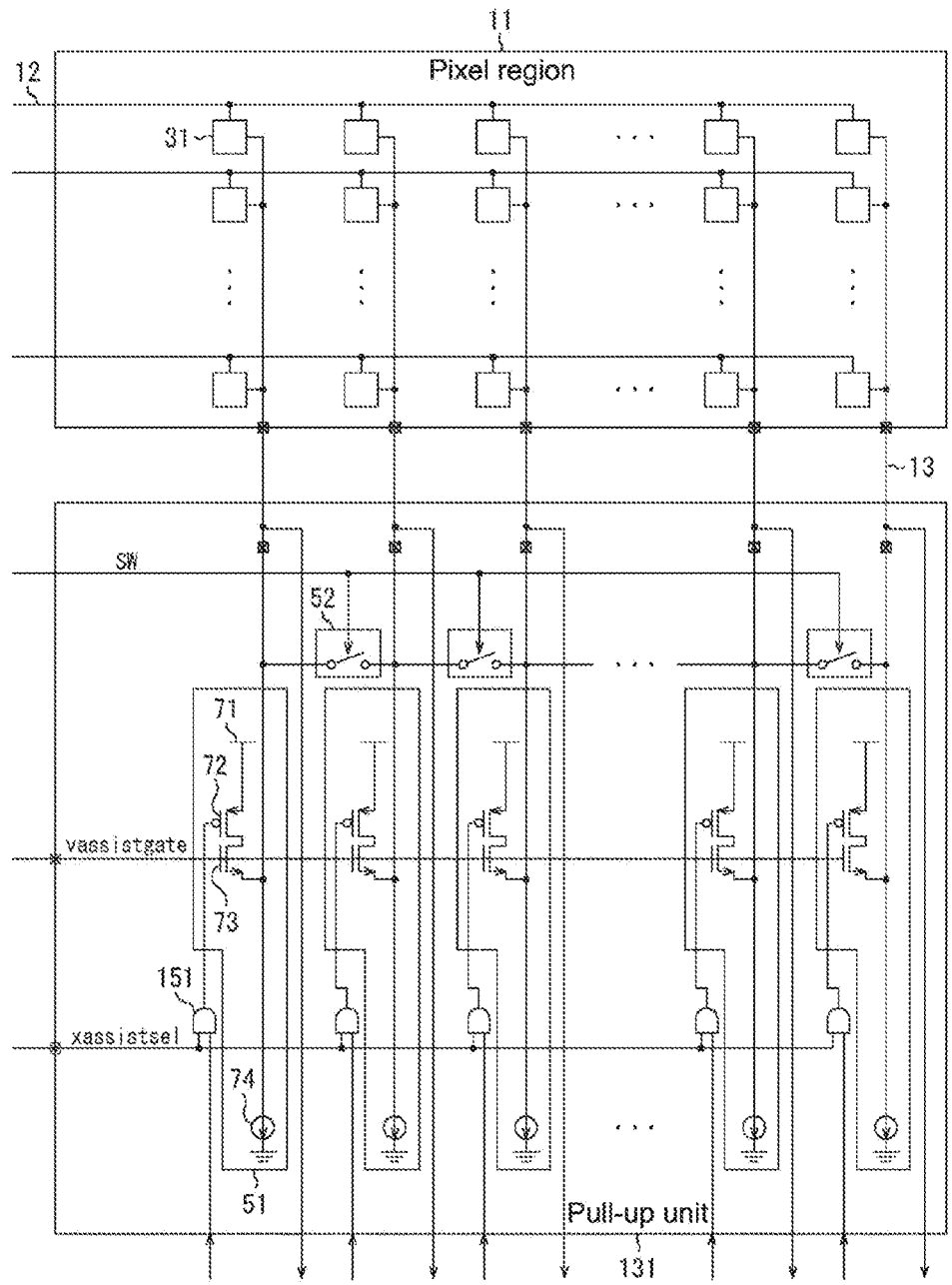
FIG. 7 is a diagram showing a configuration example of a pixel region and a pull-up unit of FIG. 6.

FIG. 7 is a diagram showing a configuration example of the pixel region 11 and the pull-up unit 131.

The configurations of FIG. 7 similar to the configurations of FIG. 2 are denoted by the same reference signs. Overlapping descriptions will be omitted as appropriate.

The configuration of the pull-up unit 131 of FIG. 7 is different from the configuration of the pull-up unit 15 of FIG. 2 in that m AND circuits 151 are newly provided for the vertical signal lines 13, respectively.

The control signal xassistsel is input to the AND circuits 151 from the pull-up driving unit 132 of FIG. 6. In addition, the most significant bit of the pixel data of the pixels 31 in the row-in-front-of-the-selected-row is input to the AND circuit 151 from the A/D conversion circuit of the column processing unit 133 of the corresponding column. The AND circuit 151 turns on the transistor 72, in a case where the control signal xassistsel is on (1) and the most significant bit of the pixel data is 1. On the other hand, the AND circuit 151 turns off the transistor 72, in a case where the control signal xassistsel is off (0) or the most significant bit of the pixel data is 0.

In this manner, in a case where the pixel data has a size greater than ½ of the maximum value, the transistor 72 is turned on and the pull-up circuit 51 is driven for the predetermined period at the time of starting the read operation of the pixels 31 in the selected row.

The timing chart of the CMOS image sensor 130 is the same as the timing charts of FIG. 4 and FIG. 5 in a case where the most significant bit of the pixel data of the pixels 31 in the row-in-front-of-the-selected-row is 1.

It should be noted that only the most significant bit of the pixel data is input to the AND circuit 151 in the second embodiment, but the bit input to the AND circuit 151 may be any bit other than the most significant bit. In addition, the number of bits input to the AND circuit 151 may be 2 or more. Furthermore, the bit input to the AND circuit 151 is not the bit itself of the pixel data but may be an inverted value of the bit of the pixel data. By controlling the position, the number, and the inversion of the bits input to the AND circuit 151, the range of the pixel data of the pixels 31 in the row-in-front-of-the-selected-row can be arbitrarily set when the pull-up circuit 51 is driven.

Third Embodiment (Configuration Example of CMOS Image Sensor According to Third Embodiment)

Figure 8:
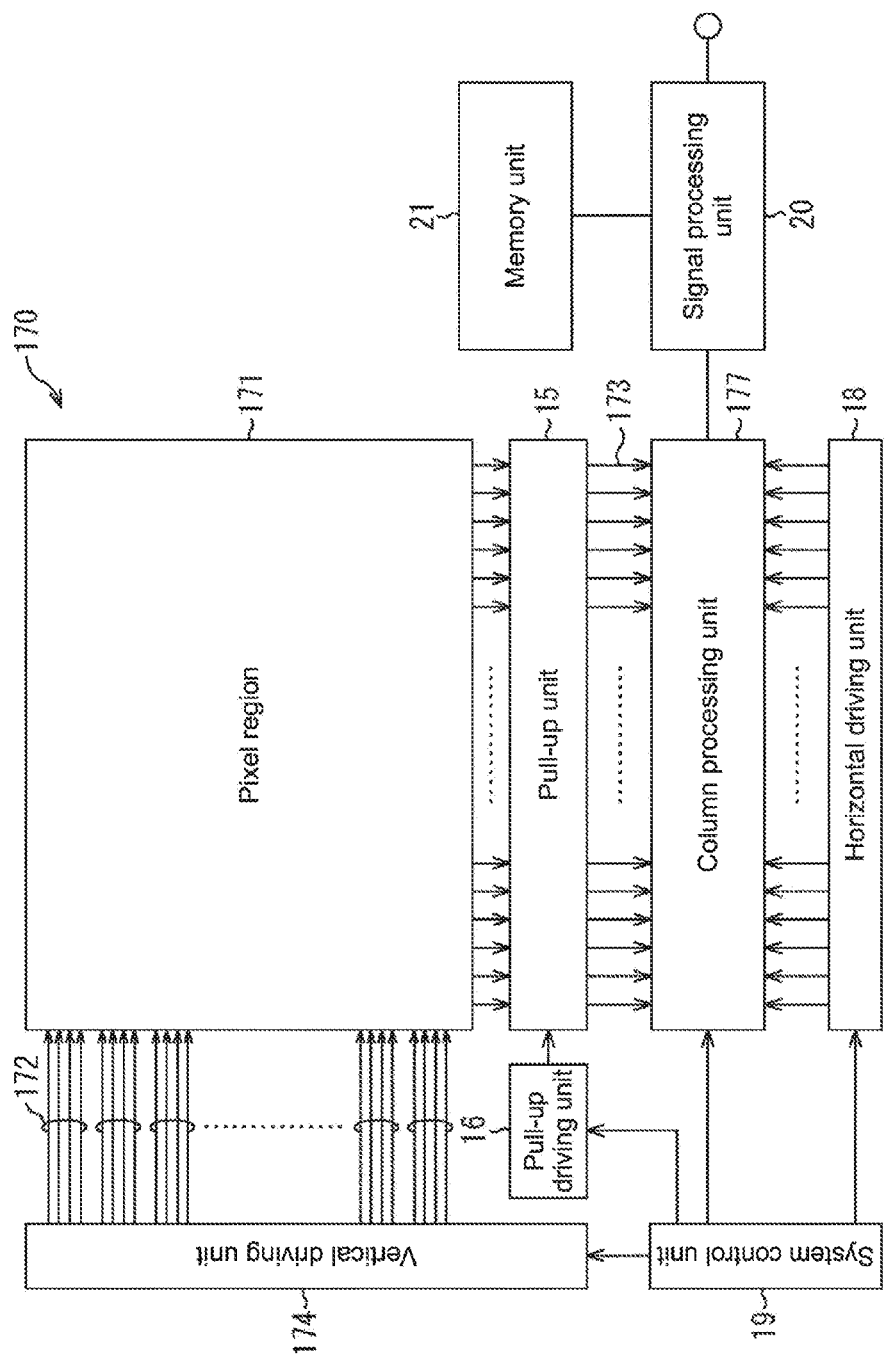
FIG. 8 is a diagram showing a configuration example of a CMOS image sensor according to a third embodiment as a solid-state image sensing apparatus to which the present disclosure is applied.

FIG. 8 is a diagram showing a configuration example of a CMOS image sensor according to a third embodiment as a solid-state image sensing apparatus to which the present disclosure is applied.

The configurations of FIG. 8 similar to the configurations of FIG. 1 are denoted by the same reference signs. Overlapping descriptions will be omitted as appropriate.

The configurations of a CMOS image sensor 170 of FIG. 8 are different from the configurations of the CMOS image sensor 10 of FIG. 1 in that a pixel region 171, pixel driving lines 172, vertical signal lines 173, a vertical driving unit 174, and a column processing unit 177 are provided in place of the pixel region 11, the pixel driving lines 12, the vertical signal lines 13, the vertical driving unit 14, and the column processing unit 17. In the CMOS image sensor 170, a vertical signal line 173 is connected to a pixel group including four columns of the pixels 31, and the read operation is performed on the pixels 31 in the selected row and in the respective columns at the same positions within the respective pixel groups (hereinafter referred to as columns within a pixel group) respectively in the order.

Specifically, the pixels 31 are two-dimensionally arranged in a matrix in the pixel region 171 of the CMOS image sensor 170, and imaging is performed. In addition, the four pixel driving lines 172 are formed for one row of the pixels 31, each pixel driving line 172 corresponding to each column within the pixel group, and the vertical signal line 173 is formed for four columns.

The vertical driving unit 174 includes a shift resistor, an address decoder, and the like, and drives the pixel 31 of each row unit and of each column within the pixel group in the pixel region 171. One end of each pixel driving line 172 is connected to an output end (not shown), which corresponds to each row and each column within the pixel group, of the vertical driving unit 174.

Although a specific configuration of the vertical driving unit 174 is not shown, the vertical driving unit 174 includes two scanning systems of a read scanning system and a sweep scanning system, and performs an interleaving operation, in which the read scanning system reads the pixels 31 in one column within the pixel group and the sweep scanning system resets the pixels 31 in another column within the pixel group at the same time.

Specifically, the read scanning system selects each row and each column within the pixel group in the order in order to read a pixel signal from the pixel 31 in each row unit and each column within the pixel group. The read scanning system outputs a selection signal, a transfer signal, and the like from the output end connected to the pixel driving line 172 of the selected row and each column within the selected pixel group. Thus, the read operation is performed on the pixel 31 in the selected row and each column within the selected pixel group by the read scanning system, and the read reset level signal and the read pixel signal are fed to the column processing unit 177 via the vertical signal lines 173.

The sweep scanning system outputs a reset signal from the output end connected to the pixel driving lines 172 of the row-to-be-selected-next and each column within the selected pixel group during the read operation of the pixel 31 in the selected row and each column within the selected pixel group in order to sweep unnecessary charges accumulated in the photoelectric conversion element of the pixel 31 in the row-to-be-selected-next and each column within the selected pixel group. Through the scanning by the sweep scanning system, the reset operation is performed on the pixel 31 in the row-to-be-selected-next and each column within the selected pixel group during the read operation of the pixel 31 in the selected row and each column within the selected pixel group.

The column processing unit 177 includes the A/D conversion circuits, each A/D conversion circuit being for four columns of the pixel region 171, and the D/A conversion circuit common to all the columns. Each A/D conversion circuit has the configuration similar to the configuration of the A/D conversion circuit of the column processing unit 17 of FIG. 1, and performs the A/D conversion processing, the CDS processing, and the like with respect to the pixel signal fed from the pixels in the selected row and the column within the selected pixel group through the vertical signal lines 173.

(Configuration Example of Pixel Region and Pull-Up Unit)

Figure 9:
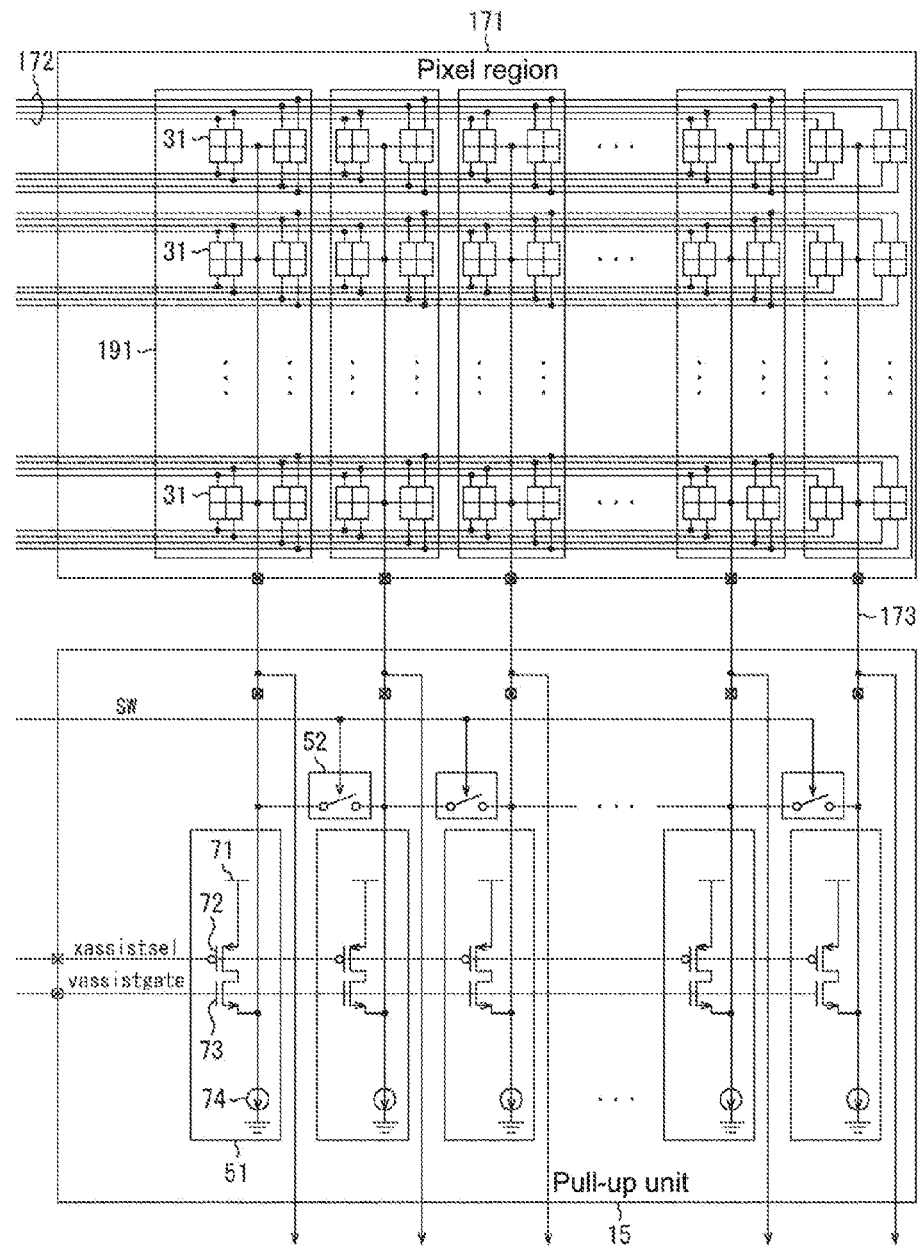
FIG. 9 is a diagram showing a configuration example of a pixel region and a pull-up unit of FIG. 8.

FIG. 9 is a diagram showing a configuration example of the pixel region 171 and the pull-up unit 15.

As shown in FIG. 9, the pixels 31 are two-dimensionally arranged in a matrix of n rows and m columns (n and m each is an integer of 1 or more) in the pixel region 171. Each pixel driving line 172 is formed for each row and for each column within the pixel group of the pixels 31. Specifically, different pixel driving lines 172 are formed for the respective pixels 31 in the first column, the second column, the third column, and the fourth column, from left, within each pixel group 191 including the pixels 31 in the same row and in the four columns.

Furthermore, one vertical signal line 173 is formed for each pixel group 191. Specifically, a common vertical signal line 173 is formed for each pixel 31 within the pixel group 191. Therefore, the number of the pixel driving lines 172 is 4n, and the number of the vertical signal lines 173 is m/4.

(Example of Timing Chart of CMOS Image Sensor)

Figure 10:
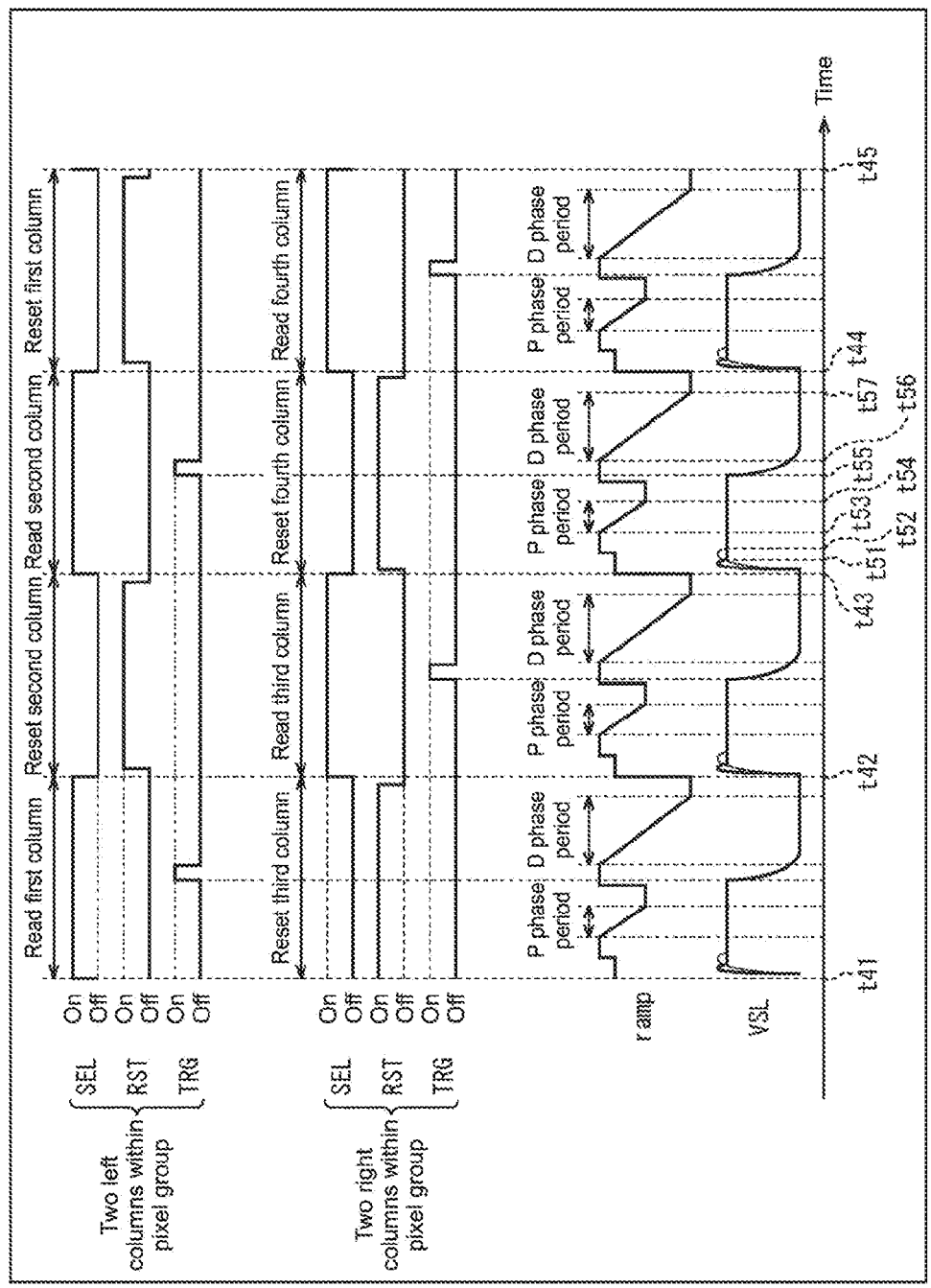
FIG. 10 is a diagram showing an example of a timing chart of the CMOS image sensor of FIG. 8.
Figure 11:
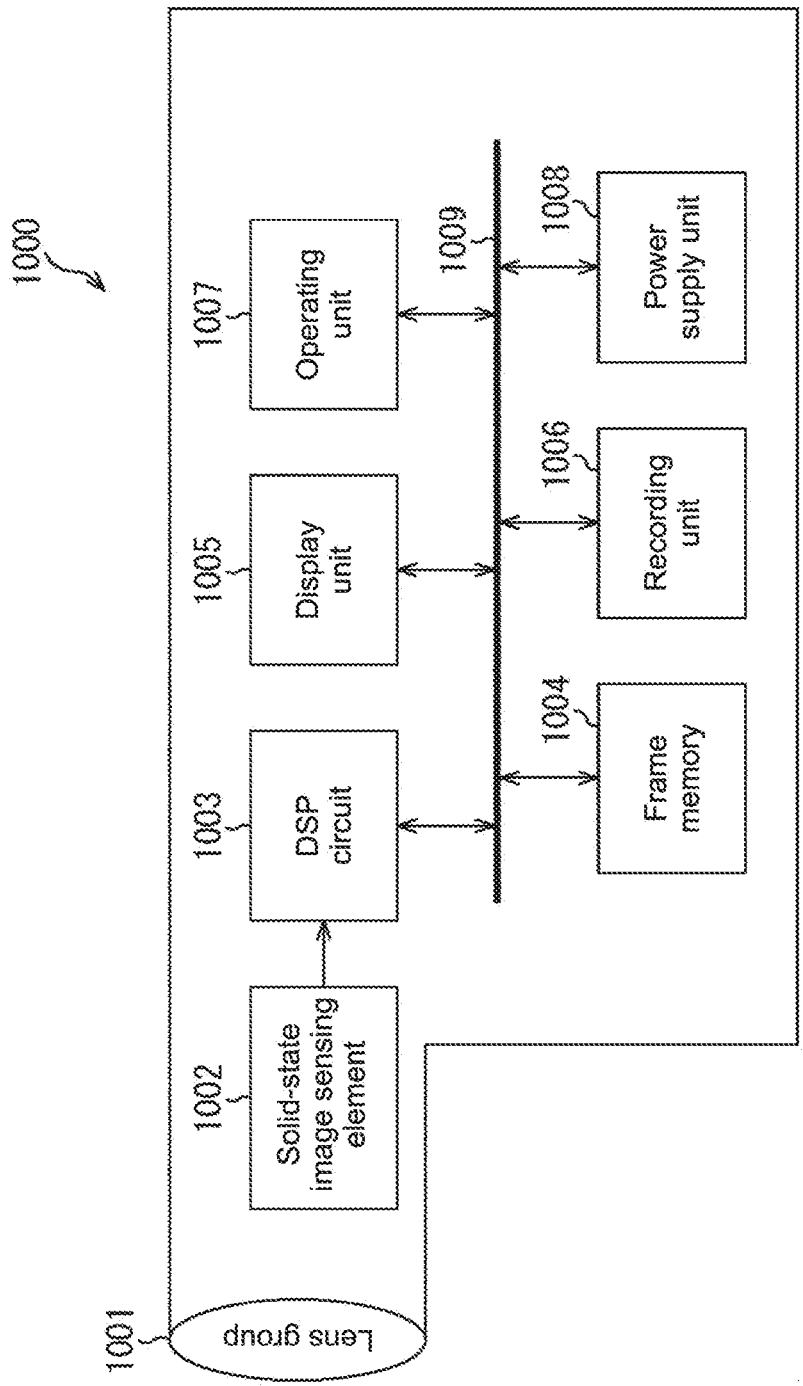
FIG. 11 is a diagram showing a configuration example an image sensing apparatus as an electronic device to which the present disclosure is applied.

FIG. 10 is a diagram showing an example of a timing chart of the potentials of the selection signals, the reset signals, the transfer signals, the ramp wave signal, and the vertical signal line 173 of the CMOS image sensor 170 of FIG. 8.

In the CMOS image sensor 170, the vertical driving unit 174 selects the row in the order from the top, and selects the columns within the pixel group in the order of the first column, the third column, the second column, and the fourth column from left. Then, the vertical driving unit 174 turns on the selection signal (SEL) of the selected row and each column within the selected pixel group, whereby the read operation is performed on the pixel 31 in the selected row and each column within the selected pixel group. While the read operation is performed on the pixel 31 in the selected row and each column within the selected pixel group, the vertical driving unit 174 turns on the reset signal (RST) of the pixel 31 in the row-to-be-selected-next and each column within the selected pixel group, whereby the reset operation is performed on the pixels 31.

Thus, the selection signal for the selected row and the first column from left of the columns within the pixel group is turned on between the time t41 and the time t42, and the selection signal for the third column of the columns within the pixel group is turned on between the time t42 and the time t43, as shown in FIG. 10. Then, the selection signal for the second column of the columns within the pixel group is turned on between the time t43 and the time t44, and the selection signal for the fourth column of the columns within the pixel group is turned on between the time t44 and the time t45.

Also, the reset signal for the third column of the columns within the pixel group is turned on between the time shortly after the time t41 and the time shortly before the time t42, and the reset signal for the second column of the columns within the pixel group is turned on between the time shortly after the time t42 and the time shortly before the time t43. Then, the reset signal for the fourth column of the columns within the pixel group is turned on between the time shortly after the time t43 and the time shortly before the time t44, and the reset signal for the first column of the columns within the pixel group is turned on between the time shortly after the time t44 and the time shortly before the time t45.

Then, the next row is selected as a selected row at the time t45, the read operation is performed similarly on the pixels 31 in the selected row and in the order of the first column, the third column, the second column, and the fourth column from left of the columns within the pixel group after the time t45.

Also, in this case, when the selection signal for the pixels 31 in the second column of the columns within the pixel group is turned on at the time t43, the reset level signal for the pixels 31 is read by the vertical signal line 173 similar to the case shown in FIG. 4.

However, the read operation is performed on the pixels 31 in the third column of the columns within the pixel group until the time t43. Thus, in a case where the potential of the pixel signal for the pixels 31 in the third column of the columns within the pixel group is low, the CMOS image sensor having no pull-up unit 15 takes much time to settle the potential VSL down to the potential of the reset level signal for the pixels 31 in the second column of columns within the pixel group, as shown by the thin line of FIG. 10. In other words, a settling time between the time t43 at which the read operation is started and the time t52 at which the potential VSL is settled down to the potential of the reset level signal becomes long. As result, a read operation period between the time t43 and the time t44 becomes long.

In contrast, in the CMOS image sensor 170 having the pull-up unit 15, the control signal xassitsel is turned on over the predetermined period from the time t43 at which the read operation of the pixels 31 in the second column of the columns within the pixel group is started, similar to the case shown in FIG. 5. In this manner, in a case where the potential VSL is the potential of the signal vassistgate or less over the predetermined period from the time t43, an increase of the potential VSL is assisted by the pull-up unit 15.

In addition, the control signal SW is turned on over the predetermined period from the time t43. In this manner, all the m/4−1 switches 52 are turned on over the predetermined period from the time t43, and all the vertical signal lines 173 are averaged.

In view of the above, the potential VSL increases rapidly from the potential of the pixel signal for the pixels 31 in the third column of the columns within the pixel group after the time t43, and settles down to the potential of the reset level signal for the pixels 31 in the third column of the columns within the pixel group at the time t51 before the time t52, as shown by the thick line of FIG. 10. In other words, the settling period is the period between the time t43 and the time t51 that is shorter than the period between the time t43 and the time t52. As a result, the read operation period between the time t43 and the time t44 can be reduced, and a frame rate can be increased.

After the time t52, the A/D conversion of the reset level signal for the pixels 31 in the second column of the columns within the pixel group is performed between the time t53 and the time t54. Thereafter, the vertical driving unit 174 turns on the transfer signal for the pixels 31 in the third column of the columns within the pixel group at the time t55. In this manner, the pixel signal for the pixels 31 in the third column of the columns within the pixel group is read by the vertical signal line 173. Thereafter, the A/D conversion of the pixel signal for the pixels 31 in the second column of the columns within the pixel group is performed between the time t56 and the time t57.

Here, although only the read operation of the pixels 31 in the second column of the columns within the pixel group is described, the same applies to the read operation of the pixels 31 in other rows of the columns within the pixel group.

It should be noted that the number of the columns constituting the pixel group 191 is four in the third embodiment, but the number of the columns constituting the pixel group 191 can be arbitrarily set.

Fourth Embodiment (Configuration Example According to Embodiment of Image Sensing Apparatus)

FIG. 11 is a diagram showing a configuration example according to an embodiment of the image sensing apparatus as an electronic device to which the present disclosure is applied.

An image sensing apparatus 1000 of FIG. 11 is a video camera, a digital still camera, or the like. The image sensing apparatus 1000 includes a lens group 1001, a solid-state image sensing device 1002, a DSP circuit 603, a frame memory 1004, a display unit 1005, a recording unit 1006, an operating unit 1007, and a power supply unit 1008. The DSP circuit 1003, the frame memory 1004, the display unit 1005, the recording unit 1006, the operating unit 1007, and the power supply unit 1008 are connected to each other via a bus line 1009.

The lens group 1001 takes incident light (imaging light) from an object, and forms an image on an imaging surface of the solid-state image sensing device 1002. The solid-state image sensing device 1002 includes the above-described CMOS image sensor 10 (130, 170). The solid-state image sensing device 1002 converts the amount of incident light for forming the image on the imaging surface by the lens group 1001 into an electric signal for a pixel unit, and feeds the electric signal to the DSP circuit 1003 as the pixel signal.

The DSP circuit 1003 performs predetermined image processing on the image signal fed from the solid-state image sensing device 1002, feeds the image signal after the image processing to the frame memory 1004 for a frame unit, and makes the frame memory 1004 to temporarily store the image signal.

The display unit 1005 includes a panel display device such as a liquid crystal panel, an organic EL (electroluminescence) panel, or the like, for example, and displays the image on the basis of the pixel signal for the frame unit temporarily stored in the image frame memory 1004.

The recording unit 606 includes a DVD (Digital Versatile Disk), a flash memory, or the like, and reads and records the pixel signal for the frame unit temporarily stored in the image frame memory 1004.

Operated by a user, the operating unit 1007 issues operating instructions as to various functions of the image sensing apparatus 1000. The power supply unit 1008 supplies various power sources to the DSP circuit 1003, the frame memory 1004, the display unit 1005, the recording unit 1006, and the operating unit 1007, as appropriate.

The electronic device to which the present technology is applied may be a device using a CMOS image sensor for an image capture unit (photoelectric conversion unit), and may be applicable not only to the solid-state image sensing apparatus 1000 but also to a mobile terminal apparatus having an image sensing function, a copying machine including an CMOS image sensor in an image read unit, and the like.

The embodiments of the present disclosure are not limited to the above-described embodiments. Various modifications and alterations of the present disclosure may be available without departing from the spirit and scope of the present disclosure.

For example, the A/D conversion circuit may be provided not for one or more columns, but for one or more pixels.

In the first to third embodiments, the vertical driving unit 14 (174) performs the interleaving operation. Alternatively, the vertical driving unit 14 (174) may be driven to perform the read operation on the pixels 31 in the selected row and the reset operation on the pixels 31 in the row-to-be-selected-next in this order. Also in this case, the settling time of the potential VSL of the vertical signal line 13 (173) can be reduced at the time of the read operation by the pull-up circuit 51.

The present disclosure may also have the following configurations.

(1) A solid-state image sensing apparatus, including:
an A/D converter that A/D converts pixel signals of a plurality of pixels,
a vertical signal line that feeds the pixel signals output from the pixels to the A/D converter, and
a circuit that increases a potential of the vertical signal line at the time of starting a read operation of the pixels.

(2) The solid-state image sensing apparatus according to (1), in which
the circuit is configured to be formed of a transistor.

(3) The solid-state image sensing apparatus according to (2), in which
the circuit is configured to increase the potential of the vertical signal line in a case where the potential of the vertical signal line is equal to or less than a predetermined value.

(4) The solid-state image sensing apparatus according to (2) or (3), in which
the circuit is configured to increase the potential of the vertical signal line in a case where digital data obtained as a result of the A/D conversion is equal to or less than a predetermined value.

(5) The solid-state image sensing apparatus according to any of (1) to (4), in which
the circuit is configured to increase the potential of the vertical signal line in a case where a gain of the A/D conversion is equal to or less than a predetermined value.

(6) The solid-state image sensing apparatus according to any of (1) to (5), in which
the circuit is configured to increase the potential of the vertical signal line for a predetermined period.

(7) The solid-state image sensing apparatus according to any of (1) to (6), further including:
a connector that controls a connection of a plurality of vertical signal lines, in which
the connector connects the plurality of vertical signal lines for a predetermined period at the time of starting the read operation of the pixels.

(8) The solid-state image sensing apparatus according to any of (1) to (7), in which
while the read operation is performed on a part of the plurality of pixels, a reset operation is performed on other pixels.

(9) A control method, including the step of:
by a solid-state image sensing apparatus including an A/D converter that A/D converts pixel signals of a plurality of pixels and a vertical signal line that feeds the pixel signals output from the pixels to the A/D converter, increasing a potential of the vertical signal line at the time of starting a read operation of the pixels.

(10) An electronic device, including:

an A/D converter that A/D converts pixel signals of a plurality of pixels;

a vertical signal line that feeds the pixel signals output from the pixels to the A/D converter; and a circuit that increases a potential of the vertical signal line at the time of starting a read operation of the pixels.

REFERENCE SIGNS LIST

10 CMOS image sensor
13 vertical signal line
17 column processing unit
51 pull-up circuit
52 switch
72, 73 transistor
1000 image sensing apparatus

The invention claimed is:

1. A solid-state image sensing apparatus, comprising:
    an A/D converter configured to convert pixel signals of a plurality of pixels to obtain digital data;
    a vertical signal line configured to feed the pixel signals from the plurality of pixels to the A/D converter; and
    a circuit configured to increase a potential of the vertical signal line at a time of start of a read operation of the plurality of pixels, based on the potential of the vertical signal line that is less than a determined potential of a gate signal input to the circuit.

2. The solid-state image sensing apparatus according to claim 1, wherein the circuit comprises a transistor.

3. The solid-state image sensing apparatus according to claim 2, wherein the circuit is further configured to increase the potential of the vertical signal line based on the obtained digital data that is equal to or less than a determined value.

4. The solid-state image sensing apparatus according to claim 1, wherein the circuit is further configured to increase the potential of the vertical signal line based on a gain of the A/D converter that is equal to or less than a determined value.

5. The solid-state image sensing apparatus according to claim 1, wherein the circuit is further configured to increase the potential of the vertical signal line for a determined period.

6. The solid-state image sensing apparatus according to claim 1, further comprising a connector configured to connect a plurality of vertical signal lines for a determined period, at the time of the start of the read operation of the plurality of pixels.

7. The solid-state image sensing apparatus according to claim 1, further comprising a vertical driving unit configured to execute:
    the read operation on a part of the plurality of pixels; and
    a reset operation on remaining pixels other than the part of the plurality of pixels.

8. A control method, comprising:
    in a solid-state image sensing apparatus that includes an A/D converter that converts pixel signals of a plurality of pixels to obtain digital data and a vertical signal line that feeds the pixel signals of the plurality of pixels to the A/D converter:
    increasing, by a circuit, a potential of the vertical signal line at a time of a read operation of the plurality of pixels, based on the potential of the vertical signal line that is less than a determined potential of a gate signal input to the circuit.

9. An electronic device, comprising:
    an A/D converter configured to convert pixel signals of a plurality of pixels to obtain digital data;
    a vertical signal line configured to feed the pixel signals of the plurality of pixels to the A/D converter; and
    a circuit configured to increase a potential of the vertical signal line at a time of start of a read operation of the plurality of pixels, based on the potential of the vertical signal line that is less than a determined potential of a gate signal input to the circuit.

* * * * *